United States Patent [19]
Schatz

[11] 3,870,443
[45] Mar. 11, 1975

[54] HOT-PRESSING SYSTEM

[75] Inventor: Oskar Schatz, Harburg-Neu-Leversen, Germany

[73] Assignee: Frid. Krupp Gesellschaft mit Beschrankter Hoftung, Essen, Germany

[22] Filed: Apr. 15, 1974

[21] Appl. No.: 461,140

[30] Foreign Application Priority Data
Apr. 17, 1973 Germany............................ 2319295

[52] U.S. Cl................................. 425/28 R, 425/233
[51] Int. Cl.................................................. B29h 5/02
[58] Field of Search ........ 425/25, 29, 30, 233, 28 R

[56] References Cited
UNITED STATES PATENTS

| | | | |
|---|---|---|---|
| 2,173,588 | 9/1939 | Mabler.............................. | 425/29 X |
| 2,204,531 | 6/1940 | Erbguth ............................ | 425/29 |
| 2,736,060 | 2/1956 | Glynn ................................ | 425/25 |
| 3,154,814 | 11/1964 | Fike ................................... | 425/25 |
| 3,241,190 | 3/1966 | Laudisa.............................. | 425/25 |
| 3,579,626 | 5/1971 | Brittain............................. | 425/30 X |
| 3,659,974 | 5/1972 | Neugroschl......................... | 425/29 |
| 3,734,656 | 5/1973 | Balle................................. | 425/233 X |

FOREIGN PATENTS OR APPLICATIONS
191,280   8/1957   Austria .................................. 425/29

*Primary Examiner*—J. Howard Flint, Jr.
*Attorney, Agent, or Firm*—Karl F. Ross; Herbert Dubno

[57] ABSTRACT

A hot-pressing system comprises a plurality of subsystems each including a pair of presses having a frame, a lower mold half carried on the frame, and an upper mold half displaceable by a pair of hydraulic cylinders relative to the frame. Each subsystem is provided with a single control unit and a single heating unit which serve to operate and heat the two presses. A single source of fluid pressure is connected via the control units to each of the subsystems and serves to actuate them. The presses are provided with hydraulically actuatable means serving to lock the upper mold half in place once it is displaced down onto the lower mold half. In addition cylinders of large effective piston area are provided which serve to prestress the two mold halves together in the closed position thereof when the other mold half is blocked by the locking means.

16 Claims, 6 Drawing Figures

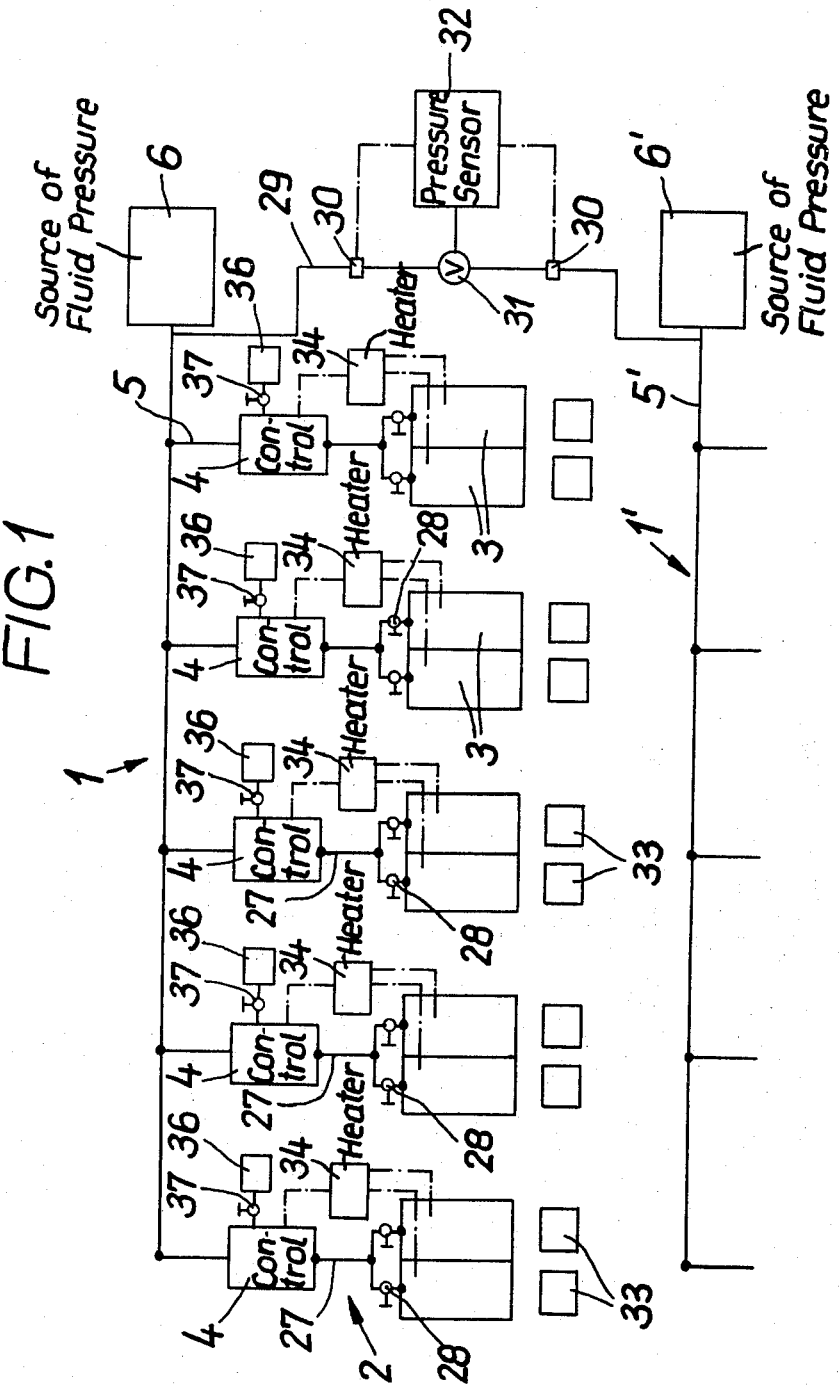

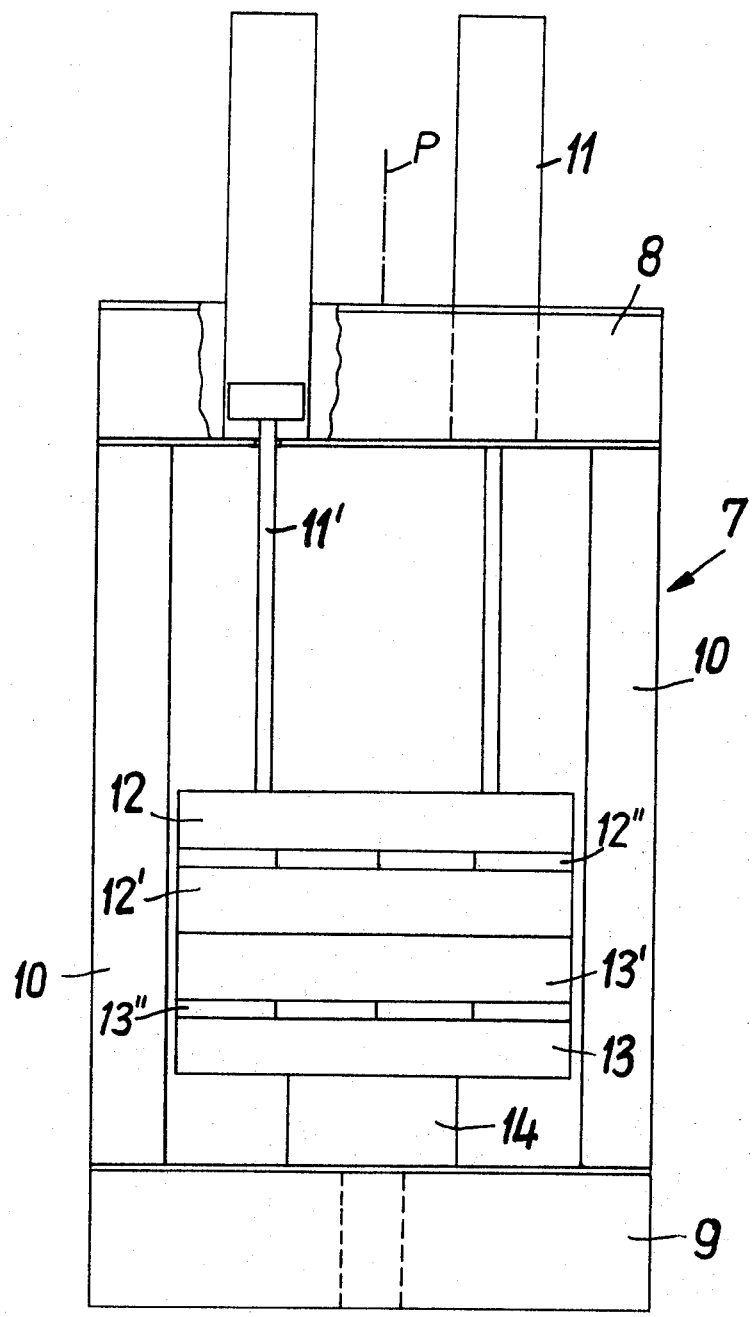

ved with a control unit. Frequently also each press has its own hydraulic-fluid reservoir and pump for pressurizing its cylinder, although it is known to provide a common source of fluid pressure to actuate all of the presses through their respective control units.

HOT-PRESSING SYSTEM

FIELD OF THE INVENTION

The present invention is related to a hot-pressing system. More particularly this invention concerns a hot-pressing system having a plurality of presses for the production of tires and the like.

BACKGROUND OF THE INVENTION

A tire plant usually has a plurality of hot presses each comprising a frame, a pair of mold halves on the frame, and at least one hydraulic cylinder for displacing at least one of the mold halves toward and away from the other half. In addition each press is provided with means for heating the mold halves, and each press is provided with a control unit. Frequently also each press has its own hydraulic-fluid reservoir and pump for pressurizing its cylinder, although it is known to provide a common source of fluid pressure to actuate all of the presses through their respective control units.

Such a system is relatively expensive in that all of the various control elements must be provided in each and every press. Furthermore it is necessary to provide a great deal of floor for the presses so as to allow access to each of the presses from all sides.

OBJECTS OF THE INVENTION

It is therefore an object of the present invention to provide an improved hot-pressing system.

Another object of this invention is the provision of such a system which is relatively inexpensive and simple.

A futher object is to provide a system which is relatively inexpensive and takes up a relatively small amount of floor space.

SUMMARY OF THE INVENTION

These objects are attained according to the present invention in a hot-pressing system comprising a plurality subsystems each including at least two presses secured together in tandem and each having a frame, a first mold half carried on the frame, a pair of hydraulic cylinders carried on the frame to either side of the central plane thereof, and a second mold half carried on the cylinders. Each subsystem is provided with a control unit which is connected on one side to both of the presses for displacing their second mold halves with the respective cylinders toward and away from the respective first mold half. The system has a single hydraulic actuator, including a source of fluid pressure and conduits connecting this source with the other sides of each of the control units.

Thus according to the present invention each of the control units serves double duty, operating a pair of like presses. Only a single pump and fluid reservoir need be provided for all of the presses, so that the cost of the system is greatly reduced. The amount of floor space necessary for a given number of presses is thus reduced by 40 percent.

In accordance with another feature of this invention each subsystem is provided with a single heating means serving to heat the mold halves thereof.

According to yet another feature of this invention the two cylinders serve only to close the mold halves. The mold halves are held together by separate cylinders or jacks having pistons of substantially greater total surface area than the total effective surface area of the closing cylinders so as to be able to exert considerably greater force on the mold halves. Latching means is provided for arresting the second mold half relative to the frame, two prestressing cylinders being effective on the first mold.

This locking means according to a further feature of this invention comprises a latching element operatively engageable between the second mold half and the frame. This locking element may comprise an hydraulically actuatable bolt carried on the second mold half and engageable in a keeper hole on the frame, or a dog pivotal on the frame and engageable between the frame and an abutment on the second mold half.

In accordance with further features of this invention the control unit comprises a valve connected to the prestressing cylinders and capable of pressurizing them at a relatively low level sufficient to displace the first mold half to an end position corresponding to a fully extended position of the prestressing cylinders, and a second relatively high pressure level serving to hold the mold halves tightly together during the hot-pressing operation. When pressurized at the relatively low level the first mold half is capable of being displaced from its end position by the other mold half as the mold is closed. Thus in the open position the first mold half, which is usually the lower mold half, is in an upper position and the second mold half, which is the upper half, is also in an upper position well away from the lower mold half. Energization of the cylinders operating the upper mold half drop it down on top of the lower mold half, depressing it until the locking means is actuated by the control unit to present raising of the upper mold half beyond a determined intermediate position. Then the pressure is raised in the prestressing cylinders effective on the lower mold half to hold the mold tightly closed during the pressing operation.

In accordance with another feature of the invention the stroke of the prestressing cylinders is equal to the distance between the maximum mold height and minimum mold height so that a complicated readjustment of the press is not necessary when the mold is changed.

According to yet another feature of this invention sensing means is provided connected to the hydraulic actuating means of a system according to the present invention and is connected to the conduits of another such system according to the invention. Thus when the pressure falls in one of the systems according to this invention the fluid pressure of the other system can be used so as to prevent the presses from opening in the middle of the cycle.

BRIEF DESCRIPTION OF THE DRAWING

The above and other objects, features and advantages will become more readily apparent from the following, reference being made to the accompanying drawing in which:

FIG. 1 is a diagrammatic top view of a system according to the present invention;

FIG. 2 is a front view of a press according to the present invention;

SPECIFIC DESCRIPTION

Figure 3A:
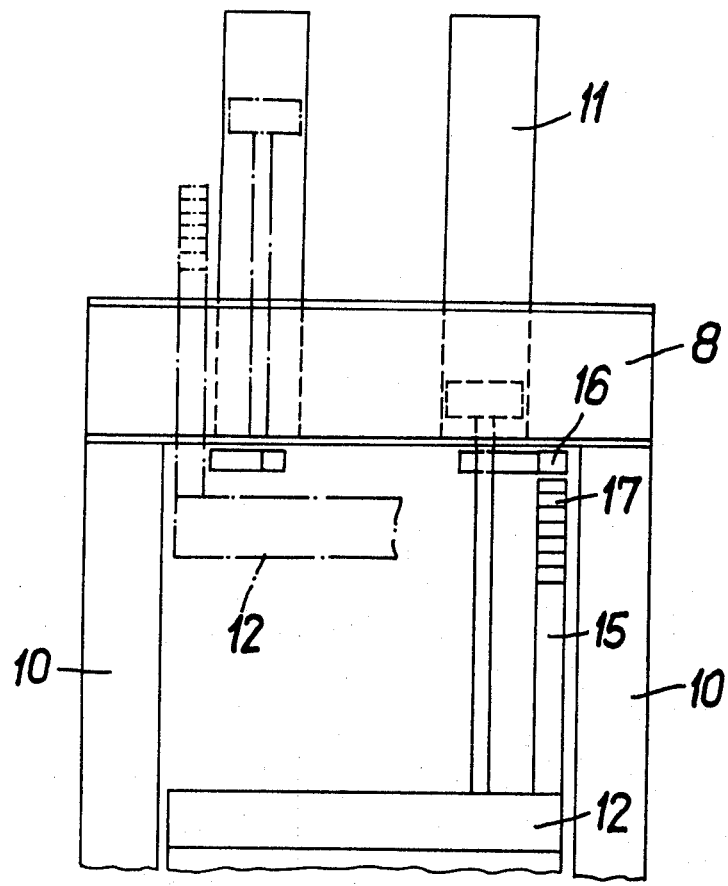
FIGS. 3a and 3b and front and top views, respectively, of another press in accordance with this invention.

As shown in FIG. 1 a system 1 according to the present invention comprises a plurality of subsystems 2 each formed of two like presses 3 connected via conduits 27 and valves 28 to one side of control units 4 whose other sides are connected via conduits 5 to a source 6 of fluid pressure. A similar system 1' has a conduit 5' connected to conduits 5 via a shunt 29 having a pair of sensors 30 and a valve 31 operated by a pressure monitor or sensor 32 which operates the valve 31 to connect the two systems together whenever a pressure in one system falls below a predetermined level, so as to prevent dangerous opening of the presses 3 in mid cycle.

Each subsystem 2 is provided with an independently operable heater arrangement 34 and each press 3 is provided with a respective loader 33 which places workpieces in the press and removes them from the press after the hot-pressing operation. The heaters 34 each comprise a small thermostatically controlled boiler which passes live steam throuh mold halves as described below. In addition each control unit has a high-pressure reservoir 36 which it can tap through a valve 37 should pressure in the subsystem drop.

As shown in FIG. 2 a press 3 comprises a frame 7 having a horizontal upper portion 8 and a base 9 connected together by upright posts 10. It can be seen that the entire press mechanism is enclosed within the outline of the side beams 10 so that the presses can be stood one right next to the other. A pair of vertical and parallel cylinders equispaced to either side of a central plane P of the press each have a ram 11' connected to an upper support plate 12 on which an upper mold half 12' is supported by insulation blocks 12''. A lower mold half 13' is mounted via insulation blocks 13'' on a lower support plate 13 resting on the base 9 via a support block 14. A press as shown in FIG. 2 is used for relatively light hot-pressing operations, as the fluid pressure in the cylinder 11 is used to open and close the press, as well as to hold the press tightly closed during the pressing operation. Such a press is used for example for the vulcanization of small tires. The space between the two cylinders is left free for use by the mold-operating equipment.

Figure 3B:
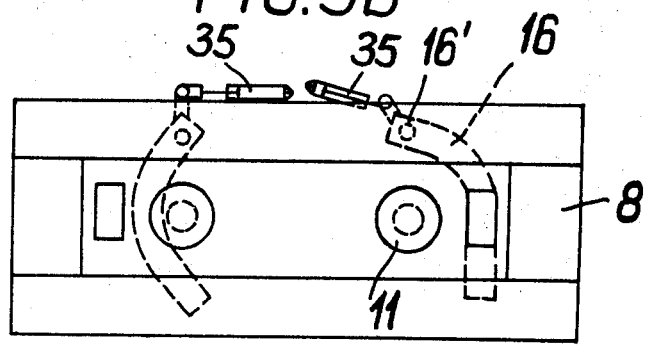

It is possible as shown in FIG. 3a and 3b to provide locking means for holding the upper mold support plate 12 down during the pressing operation. This locking means comprises a locking element or dog 16 pivoted on the upper portion 8 of the press to rotate about a vertical axis 16' next to each of the cylinders 11. A small hydraulic cylinder 35 is provided to swing each of the dogs between the positions shown in FIG. 3b. The upper mold support plate 12 is provided with a post or abutment 15 fitted on its top with a plurality of spacer bodies 17. When swung into position illustrated to the right in FIG. 3d the dog 16 is in line with the abutment 15 and prevents lifting of the plate 12.

Figure 4:
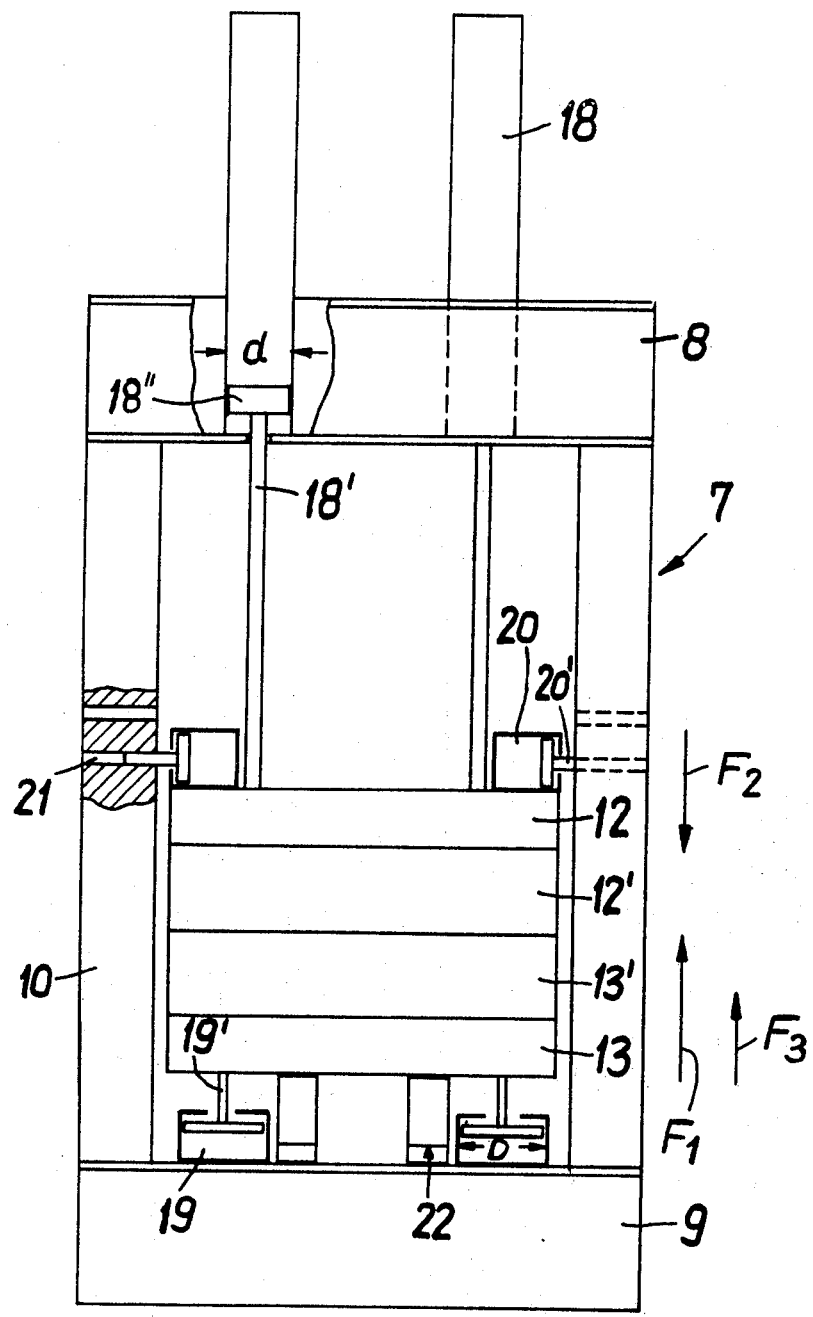
FIG. 4 is a front view of yet another press in accordance with this invention.
Figure 5:
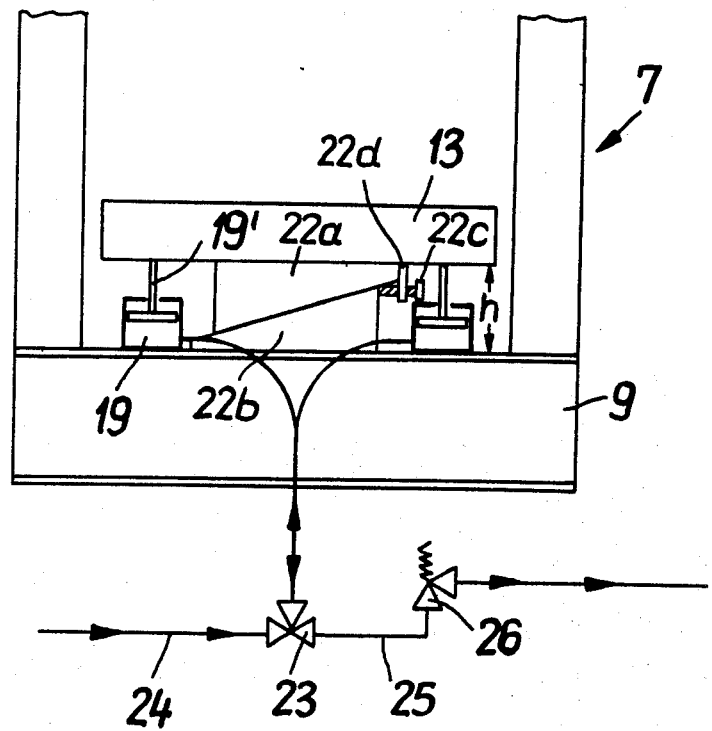
FIG. 5 is a side view in partly diagrammatic form illustrating a detail of the press of FIG. 4.

The arrangement shown in FIGS. 4 and 5 is used for vulcanizing truck tires and uses a pair of cylinders 18 similar to the cylinders 11 and which each have a ram 18' that serves only to open and close the mold 12', 13'. The lower mold half 13' normally rests via its support plate 13 on a pair of support blocks 22 each formed as shown in FIG. 5 by a pair of wedges 22a and 22b which can be displaced relative to each other by a screw 22c threaded in a flange 22d on the wedge 22a and engageable with the wedge 22b. Thus the height $h$ of the plate 13 and therefore of the mold half 13' above the base 9 is determined by this block 22, this position corresponding to the lower end position of these elements.

The mold 12', 13' is prestressed and held closed during this hot-pressing operation by at least two cylinders 19 having rams 19' of a diameter $D$ which is substantially greater than the diameter $d$ of the rams 18'. Thus these rams are capable of exerting an upward force $F_1$ which is substantially greater than the downward force which is exerted by the rams 18', given the same fluid pressure operating them. As shown in FIG. 5 the cylinder 19' are connectable via a three-way valve 23 to a high-pressure line 24 or a low-pressure line 25. The pressure in the low-pressure line is controlled by a valve 26 so that the force $F_3$ exerted by the cylinders 19 when they are connected to this low-pressure line 25 is sufficient to lift the lower mold 13' and its support plate 13, but still is less than the downward force $F_2$ exerted by the rams 18'. When connected to the high-pressure line the cylinders 19 exert an upward force $F_1$ which is substantially greater than the force $F_2$.

In order to prevent the lower mold half 13' from forcing the upper mold half 12' up once the cylinders 19 are connected to the high-pressure line 24 there are provided locking cylinders 20 each having a ram 20' engageable in a corresponding hole 21 in the uprights 10 of the press frame 7.

The control systems 4 operate the two presses 3 according to the exact same program. Fluid flow into and out of the various operating cylinders of these presses is controlled by the valve indicated schematically in FIG. 1 at 28 so that these presses all function at the same speed. In operation the control unit 4 first pressurizes the two cylinders 18 as shown in FIGS. 4 and 5 to exert downward pressure $F_2$ while it connects the cylinders 19 via valve 23 to the low-pressure line 25 so as to raise the lower mold half 13' and exert thereon a force $F_3$ substantially lesser than force $F_2$, but sufficient to lift the lower mold half to the upper position.

As soon as the upper mold half 12' engages the lower mold half 13' the control unit 4 pressurizes the cylinders 20 so that the rams 20' are pressed outwardly against the support 10. Since the force $F_2$ is greater than the force $F_3$ the upper mold half 12' will push the lower mold half 13' downwardly until the two rams 20' in holes 21, thereby effectively and rigidly preventing further vertical displacement of the mold half 12' in either direction. The valve 23 is then operated to connect the cylinders 19 to the high-pressure line 24 so as to hold the two mold halves 12', 13' very tightly together during the vulcanization operation in which superheated steam is passed from the heaters 34 through the mold halves 12' and 13'.

I claim:
1. A hot-press system comprising:
a plurality of subsystems each including a pair of presses each having a frame, a first mold half carried on said frame, a pair of hydraulic cylinders carried on said frame to either side of a central plane thereof, and a second mold half carried on said cylinders, each subsystem futher including control means connected on one side to both of said presses for displacing the second mold halves thereof with the respective cylinders toward and away from the respective first mold halves; and hydraulic actuating means including a common source of fluid pressure and conduits connected between said source and the other sides of each of said control means for hydraulic operation of each of said pairs of presses by the respective control means.

2. The system defined in claim 1 wherein each subsystem further comprises means for heating its respective mold halves.

3. The system defined in claim 1 wherein said cylinders of each press are parallel and said first mold half of each press is fixed to the respective frame, each subsystem further comprising means including a locking element operatively engageable between the respective second mold half and the respective frame for preventing displacement of the respective second mold half away from the respective first mold half with said mold halves closed together.

4. The system defined in claim 3 wherein each of said locking elements is pivoted on said frame and each of said second mold halves is provided with an abutment engageable with the respective locking element on displacement of the second mold half out of engagement with the first mold half.

5. The system defined in claim 4 wherein each abutment is provided with means for adjusting its length and thereby allowing for adjustment to mold halves of different sizes.

6. The system defined in claim 1 wherein said cylinders of each press are parallel and longitudinally extensible, each subsystem comprising at least one jack between the respective first mold half and the respective frame, the jacks of each press having pistons of total predetermined effective surface area and the cylinders of each press have pistons of lesser total effective surface area.

7. The system defined in claim 6 wherein each subsystem further comprises latch means including a lock element on the respective second mold half and engageable with the respective frame for arresting the respective second mold half relative to the respective frame.

8. The system defined in claim 7 wherein each control means includes operating means connected to the respective jacks for pressurizing same to a relatively low level sufficient to displace the respective piston and the respective second mold half when same is out of engagement with the respective first mold half but insufficient to prevent displacement of the respective second mold half by the respective first mold half and to a relatively high level of substantially greater pressure for prestressing said mold halves together.

9. The system defined in claim 6 wherein each latch means includes a hydraulically displaceable piston carrying the respective lock element, each frame being formed with a row of holes, each lock element being receivable in the holes of a respective row.

10. The system defined in claim 6 wherein each of said first mold halves is displaceable between a pair of end positions, each press including a support element between the respective first mold half and the respective frame and means for changing the effective width of said support element for changing the respective end position of the respective first half.

11. The system defined in claim 1, further comprising valve means connected between said conduits of said system and the corresponding conduits of a similar system and including a pressure monitor for connecting the first-mentioned conduits to said corresponding conduits on dropping of pressure in said first-mentioned conduits below a predetermined level.

12. The system defined in claim 1, wherein each press includes means for displacing a workpiece into and out of between the respective mold halves.

13. The system defined in claim 1 wherein each subsystem is provided with heating means for heating the mold halves of the respective presses.

14. The system defined in claim 1, further comprising a spacer block between each of said first mold halves and the respective press frame, and respective means for changing the overall height of said blocks and thereby changing the positions of the respective first mold halves relative to the respective press frames.

15. The system defined in claim 1, further comprising an emergency supply of hydraulic fluid under pressure and means for connecting said emergency supply to said conduits on the pressure in said conduits dropping below a predetermined level.

16. The system defined in claim 1, further comprising valve means for operating all of said second mold halves at the same speed.

* * * * *